United States Patent [19]
Coleman

[11] Patent Number: 4,987,739
[45] Date of Patent: Jan. 29, 1991

[54] MASTER CYLINDER WITH COLLAPSIBLE PISTON LOCATOR

[75] Inventor: John R. Coleman, Dayton, Ohio

[73] Assignee: General Motors Corporation, Detroit, Mich.

[21] Appl. No.: 375,151

[22] Filed: Jul. 3, 1989

[51] Int. Cl.$^5$ .............................................. B60T 11/20
[52] U.S. Cl. ........................................ 60/562; 60/588; 92/84; 92/129
[58] Field of Search .................... 92/84, 129, 150, 151; 60/562, 581, 533, 588

[56] References Cited

U.S. PATENT DOCUMENTS

| | | | |
|---|---|---|---|
| 3,214,914 | 11/1965 | Kling | 60/581 |
| 3,376,705 | 4/1968 | Valpreda | 60/546 |
| 3,744,513 | 7/1973 | Leitenberger | 60/562 |
| 3,839,867 | 10/1974 | Shellhause | 60/562 |
| 3,937,020 | 2/1976 | Bierlein et al. | 60/532 |
| 3,938,333 | 2/1976 | Mathues | 60/574 |
| 4,309,937 | 1/1982 | Schardt | 92/240 |
| 4,422,294 | 12/1983 | Klein | 60/588 |
| 4,553,395 | 11/1985 | Price et al. | 60/562 |
| 4,559,781 | 12/1985 | Steer et al. | 60/562 |
| 4,781,026 | 11/1988 | Kuromitsu | 60/588 |

FOREIGN PATENT DOCUMENTS

0802667  2/1981  U.S.S.R. .................. 92/151

*Primary Examiner*—Edward K. Look
*Assistant Examiner*—Christopher Verdier
*Attorney, Agent, or Firm*—Charles E. Leahy

[57] ABSTRACT

A dual master cylinder for a vehicle brake system includes a housing having a housing bore with a open end and a closed end. The open end has a piston stop. Two pistons are reciprocably received in the housing bore and define therewith a first pressurizing chamber between the pistons and a second pressurizing chamber between the second piston and the housing bore closed end. Each piston has a piston cavity opening into the respective pressurizing chamber. A first locator member and a second locator member are respectively received in the pressurizing chambers and slidably mounted in the piston cavities of the respective pistons. The first locator member projects into engagement with the rear wall of the second piston and the second locator member projects into engagement with the housing to establish the pistons at respective normal rest positions enabling fluid communication through the port between the fluid reservoir and the respective chambers. A detent associated with each of the locator members permit the collapse of the locator members within the respective piston cavity upon a first occurring forward movement of the pistons forward of the respective normal rest positions, and further acts to retain the locator members in their respective collapsed states. With the locator members remaining in the cavities, the pistons are freed for fore and aft reciprocable movement within the housing during subsequent operation of the master cylinder.

4 Claims, 1 Drawing Sheet

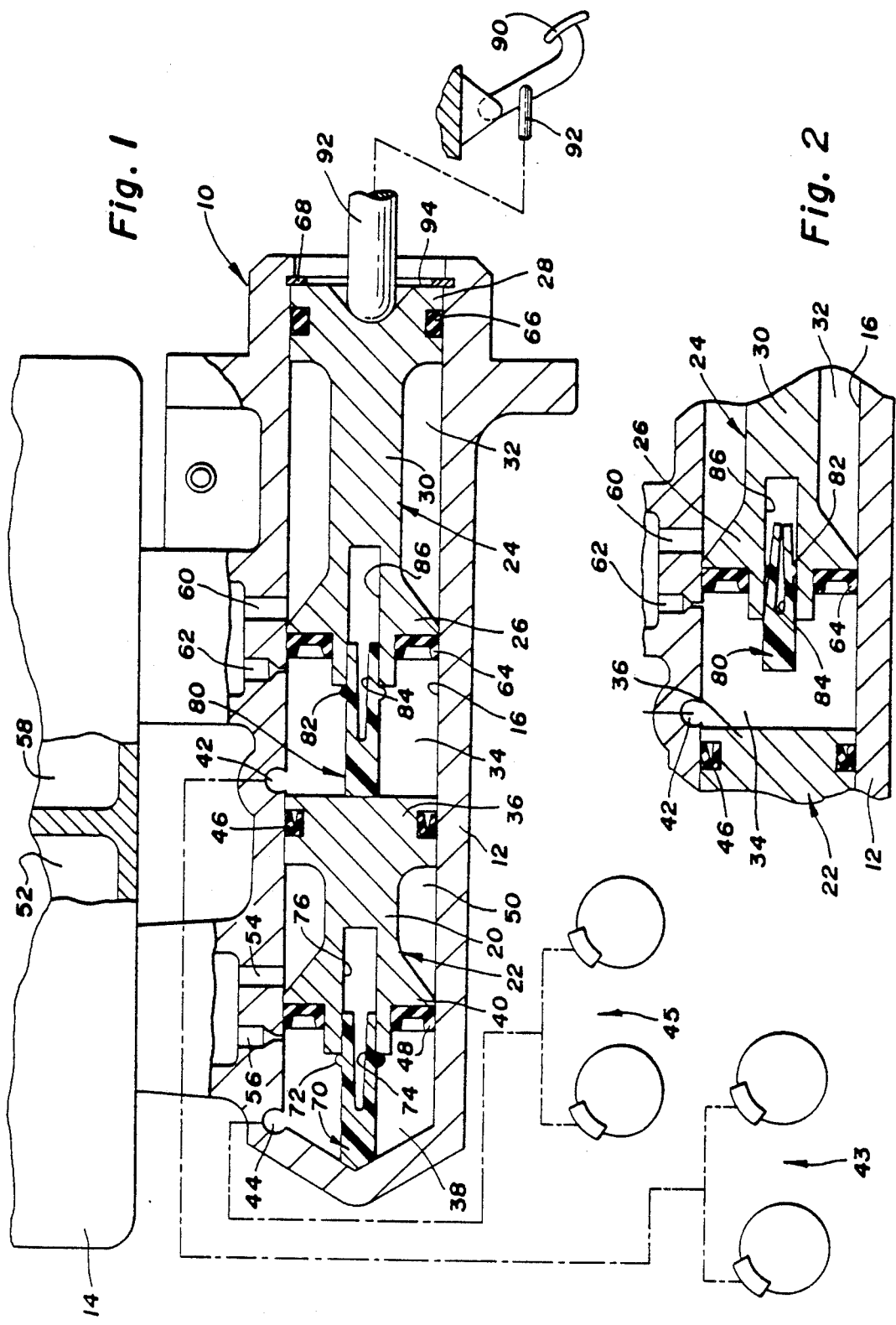

MASTER CYLINDER WITH COLLAPSIBLE PISTON LOCATOR

The present invention relates to a vehicle brake system and more particularly, to a master cylinder having a locator member for positioning the piston for initial filling of the braking system that collapses on first movement of the piston.

BACKGROUND OF THE INVENTION

Hydraulic brake systems in motor vehicles include a master cylinder to convert force exerted on the brake pedal into hydraulic pressure. The master cylinder provides the hydraulic pressure and volumetric displacement to operate the wheel brakes. The master cylinder includes a housing having a fluid reservoir and a cylinder bore which are connected by a port. A piston is slidable in the cylinder bore and carries seals between the piston wall and the bore to maintain pressure. There must be some structure to ensure that the piston does not block the port between the fluid reservoir and the cylinder bore during the filling of the system with brake fluid. Current master cylinder assemblies contain a spring which is located within the pressurizing chamber. The spring positions the piston to ensure the port is open when the brake system is first filled by an evacuation filling process in which a vacuum is created in the brake system and then brake fluid is introduced into the master cylinder reservoir and flows into the evacuated system. The springs also ensure the spacing between the piston and the closed end of the bore. In a dual circuit brake system, a spring ensures the spacing between the pistons during the operation of the master cylinder.

It would be desirable to eliminate the necessity for springs because the springs take up space in the pressurizing chambers even when compressed. The chamber must be big enough to allow the proper amount of fluid in addition to the space taken up by the spring. Eliminating the spring would allow the reduction of the size and weight of the master cylinder.

SUMMARY OF THE INVENTION

According to the invention a dual master cylinder for a vehicle brake system includes a housing having a housing bore with an open end and a closed end. The open end has a piston stop. Two pistons are reciprocably received in the housing bore and define therewith a first pressurizing chamber between the pistons and a second pressurizing chamber between the second piston and the housing bore closed end. Each piston has a piston cavity opening into the respective pressurizing chamber. A first locator member and a second locator member are respectively received in the pressurizing chambers and slidably mounted in the piston cavities of the respective pistons. The first locator member projects into engagement with the rear wall of the second piston and the second locator member projects into engagement with the housing to establish the pistons at respective normal rest positions enabling fluid communication through the port between the fluid reservoir and the respective chambers. A detent associated with each of the locator members permit the collapse of the locator members within the respective piston cavity upon a first occurring forward movement of the pistons forward of the respective normal rest positions, and further acts to retain the locator members in their respective collapsed states. With the locator members remaining in the cavities, the pistons are freed for fore and aft reciprocable movement within the housing during subsequent operation of the master cylinder.

One object, feature and advantage of the invention is to provide a means of reducing the required size of the master cylinder from that associated with the prior art, thereby reducing the weight also.

Another object of the present invention is to allow the elimination of the springs. The elimination of the springs would allow the reduction of size and weight of the master cylinder as indicated above.

Further objects, features and advantages of the present invention can become more apparent to those skilled in the art as the nature of the invention is better understood from the accompanying drawings and detailed description.

BRIEF DESCRIPTION OF THE DRAWINGS

FIG. 1 is a sectional view of the master cylinder of this invention showing the locator members establishing the pistons location prior to activation of the master cylinder.

FIG. 2 is a fragmentary sectional view of master cylinder showing the locator member collapsed after the piston has returned to the normal position after completing a stroke.

DESCRIPTION OF THE PREFERRED EMBODIMENT

A master cylinder assembly 10 includes a housing 12 and reservoir body 14. The housing has a bore 16 of uniform diameter. Since the master cylinder is shown as being of the dual circuit type, it is provided with a forward piston 22 and a rear piston 24. The rear piston 24 is the primary piston, and has a forward piston head 26 reciprocally received in the center segment of the bore 16 and a rear piston head 28 reciprocally received in aft section of the bore 16. The piston heads 26 and 28 are joined by a reduced diameter section 30 which defines a chamber 32 between the piston heads 26 and 28.

The forward piston 22 is the secondary piston and is reciprocally received in the bore 16. The forward piston 22 has forward piston head 40 and a rear piston head 36. The piston heads 40 and 36 are joined by a reduced diameter section 20 which defines a chamber 50 between the piston heads.

A high pressure pressurizing chamber 34 is defined by the bore 16, the forward piston head 26 of the primary piston 24 and the rear piston head 36 of the secondary piston 22. An outlet 42 is provided in the housing 12 to deliver brake fluid pressurized in the chamber 34 to one brake circuit 43.

The chamber 32 between the piston heads 26 and 28 is a compensation chamber which is continually connected to a brake fluid reservoir chamber 58 through a compensation port 60. A seal 66 is mounted on the piston head 28 to seal the rear end of the chamber 32. A filler port 62 provides communication between the pressurizing chamber 34 and the reservoir chamber 58 when the secondary piston is in the fully released position as shown in FIG. 1, so that a cup seal 64 carried by piston head 26 uncovers the port 62. A piston stop 68 is provided in the open end of the bore 16 and forms an abutment engaged by the piston head 28 when the master cylinder is in the fully released position.

Another high pressure pressurizing chamber 38 is defined by the piston head 40 of the secondary piston 22 and the forward end of bore 16. An outlet 44 is provided in the housing 12 to deliver brake fluid from the pressurizing chamber 38 to a second brake circuit 45. A cup seal 46 carried by the rear piston head 36 will prevent flow from the chamber 34 past the rear piston head 36. A cup seal 48 carried by the forward piston head 40 will prevent fluid from the pressurizing chamber 38 past the piston head 40.

The chamber 50 between the piston heads 36 and 40 of the secondary piston 22 is a compensation chamber which is continually connected to a brake fluid reservoir chamber 52 through a compensation port 54. A filler port 56 provides communication between the pressurizing chamber 38 and the reservoir chamber 52 when the secondary piston is in the fully released position as shown in FIG. 1, so that the cup seal 48 uncovers the filler port 56.

A locator pin or member 70 is located in the pressurizing chamber 38 and extends slidably into a cavity or bore 76 provided in the forward piston head 40 of secondary piston 22. A detent is provided by a stop knob 72 formed on the locator pin 70 and engages the face of the piston head 40 to retain the locator pin at the position of FIG. 1 in which the locator pin 70 projects into engagement with the housing to establish the secondary piston at the position of FIG. 1. The locator member has a slot 74 by which the locator member may be radially contracted to permit the locator pin 70 to collapse into the piston head 40. Once collapsed, the locator pin 70 is retained in the collapsed position by friction.

Referring again to FIG. 1, it is seen that the extended position of the locator pin 70 positions the piston 22 with the seal 48 uncovering the filler port 56 so that air may be evacuated from the system and brake fluid introduced to fill the system.

A locator pin or member 80 is located in the pressurizing chamber 34 and extends slidably into a cavity or bore 86 provided in the forward piston head 26 of primary piston 24. A detent is provided by a stop knob 82 formed on the locator pin 80 and engages the face of the piston head 26 to retain the locator pin at the portion of FIG. 1 in which the locator pin 80 projects into engagement with the secondary piston 22 rear piston head 36 to establish the primary piston at the position of FIG. 1. The locator member has a slot 84 by which the locator member may be radially contracted to permit the locator pin 80 to collapse into the piston head 26. Once collapsed, the locator member is retained in the collapsed position by friction.

Referring again to FIG. 1, it is seen that the extended position of the locator pin 80 positions the piston 24 with the seal 64 uncovering the filler port 62 so that air may be evacuated from the system and brake fluid introduced to fill the system.

When a brake pedal 90 is applied for the first time a push rod 92 engages a rear end 94 of the primary piston 24. The axial force moves the primary piston 24 toward the secondary piston 22 causing the cup seal 64 to seal off the filler port 62 from the pressurizing chamber 34. The locator pin 80 is forced into the cavity 86 as the distance between the rear head 36 of the secondary piston 22 and the primary piston 24 is reduced. The locator pin collapses into the cavity as permitted by the stop knob 82 forced radially inward to fit within the cavity 86. This is accomplished by slot 84 being narrowed as the result of being forced radially inward.

The axial force developed by the compression of fluid in the pressurizing chamber 34 causes the secondary piston 22 to move towards the closed end of the bore 16.

This causes the cup seal 48 to seal off the filler port 56 from the pressurizing chamber 38. The locator pin 70 is forced into the cavity 76 as the distance between the housing and the secondary piston 24 is reduced. The locator pin collapses into the cavity as permitted by the stop knob 72 being forced radially inward to fit within the cavity 76. This is accomplished by slot 74 being narrowed as the result of being forced radially inward.

Movement of the pistons 22 and 24 seal the pressurizing chambers 38 and 34 off from the reservoir chamber 52 and 58 by closing the filler ports 56 and 62. The brake fluid is pressurized and goes through the outlets 44 and 42 to the brake circuit 43 and 45 connected with the respective outlet.

The location of the outlet 44 with respect to the end of the bore 16 and fluid forces will prevent the forward piston 22 from moving too far forward. The location of the outlet 42 and fluid in pressurizing chamber 34 will prevent the rear piston 24 from moving too far forward.

When the brake pedal 90 is released and the force exerted by the push rod 92 on the rear end 94 of the rear piston 24 is less than that created by the fluid on the forward piston head 26, the rear piston 24 will slide rearwardly because of the pressure exerted until the cup seal 64 is just behind the filler port 62. The rear piston 24 will stop in this position since the pressure in the pressurizing chamber 34 will be released through the reservoir chamber 58. The forward piston 22 will likewise slide rearwardly when the pressure created on the rear piston head 36 is less than on the forward piston head 40. The piston 22 will stop after the cup seal 48 is just behind the filler port 56. The forward piston 22 will stop in this position since the pressure in the pressurizing chamber 38 will be released through the reservoir chamber 52. Fluid compensation required because of temperature changes will be drawn from the reservoir chambers since the pressurizing chambers 34 and 38 have open communication with the reservoir.

FIG. 2 shows the locator pin 80 after the piston has returned from a stroke. The locator pin 80 after being forced into the bore 86 is no longer functional and will remain in this collapsed position with respect to the piston 24 for the remainder of the life of the master cylinder assembly 10. The locator pin 80 is forced into the bore 86 just to the point that when the brake pedal is fully compressed the locator pin 80 will just make contact with the rear head 36 of the secondary piston 22.

The next time the brake pedal 90 is applied the push rod 92 moves the rear piston 24 leftwardly, immediately causing the cup seal 64 to close off the pressurizing chamber 34 from the reservoir chamber 58, by blocking the port 62. The pressure that is built up in the chamber 34 will both cause fluid to enter the outlet 42 and activate the associated brake circuit 43, and push the forward piston 22 forward to allow it to seal the reservoir chamber 52 from the pressurizing chamber 38. The sealing of the reservoir chamber 52 from the pressurizing chamber 38 will cause the pressure to build and force fluid to enter the outlet 44 and activate the associated brake circuit 45.

Any desired reuse of the locator pins 70 and 80 would require that the master cylinder assembly 10 be torn apart to reset the locator pins 70 and 80. However, the locator pins would not have to be reset in order to bleed the brakes if a force bleed method is used. In this method of bleeding, fluid is pressurized in the reservoir chambers 52 and 58. The fluid forced through the compensation ports 54 and 60 will reach the pressurizing chambers 38 and 34 and the brake system by going past the cup seals 48 and 64. The compensation chambers 50 and 32 are always in communication with the reservoirs 52 and 58 by way of the compensation ports 54 and 60. For example if a failure of the brake system resulted in loss of brake fluid and the filler ports 56 and 62 being sealed off by the pistons 22 and 24, the fluid that was forced past the cup seals 48 and 64 would fill the brake circuits 43 and 45. This fluid would also slide the pistons 22 and 24 back to normal position just behind the filler ports 56 and 62.

Though the preferred embodiment shows the locator pins 70 and 80 carried on the pistons 22 and 24, it is recognized that the locator pins 70 and 80 could be carried on the housing 12 and project into engagement with the pistons 22 and 24.

Thus it is seen that the objective of eliminating the springs from the master cylinder has been achieve, therefore the master cylinder can be reduced in size and weight.

The embodiments of the invention in which an exclusive property or privilege is claimed are defined as follows:

1. A master cylinder for pressurizing fluid for a wheel brake system comprising:
    a housing having a housing bore;
    a piston reciprocably received in the housing bore and cooperating with the housing to define a chamber in communication with the wheel brake system;
    a fluid reservoir having a port communicating with the chamber when the piston is established at a normal resting position within the housing bore, the port being closed off upon forward movement of the piston;
    a locator member acting between the piston and the housing to establish the piston at the normal rest position enabling fluid communication through the port between the fluid reservoir and the chamber; and
    means associated with the locator member to permit the collapse of the locator member upon a first occurring forward movement of the piston forward of the normal rest position and further acting to retain the locator member in the collapsed state, whereby the piston is freed for fore and aft reciprocable movement within the housing upon subsequent movement of the piston during operation of the master cylinder.

2. A master cylinder for pressurizing fluid for a wheel brake system comprising:
    a housing having a housing bore;
    a piston reciprocably received in the housing bore and cooperating with the housing to define a chamber in communication with the wheel brake system;
    a fluid reservoir having a port communicating with the chamber when the piston is established at a normal resting position within the housing bore, the port communication being closed off upon forward movement of the piston;
    a locator member movably mounted on the piston; and
    a detent acting between the locator member and the piston to establish the locator member at an extended position projecting into engagement with the housing to thereby establish the piston at the normal rest position enabling fluid communication between the fluid reservoir and the chamber, and the detent being effective upon movement of the locator member relative to the piston in response to a first occurring forward movement of the piston forward of the normal rest position to hold the locator member at its moved position relative the piston whereby the piston is freed for fore and aft reciprocable movement within the housing during subsequent operation of the master cylinder.

3. A master cylinder for pressurizing fluid for a wheel brake system comprising:
    a housing having a housing bore;
    a piston reciprocably received in said bore and having a forward wall cooperating with the housing to define a chamber in communication with the wheel brake system;
    a fluid reservoir having a port communicating with the chamber when the piston is established at a normal resting piston within the housing bore, the port being closed upon forward movement of the piston;
    a cavity formed in the forward wall of the piston;
    a locator member slidably mounted in the cavity and projecting into engagement with the housing to establish the piston at the normal rest position enabling fluid communication between the fluid reservoir and the chamber; and
    means associated with the locator member to permit the collapse of the locator member into the cavity upon a first occurring forward movement of the piston forward of the normal rest position, and further acting to retain the locator member in the collapsed state whereby the locator member remains in the cavity and the piston is freed for fore and aft reciprocable movement within the housing during subsequent operation of the master cylinder.

4. A dual master cylinder for a wheel brake system having a pressurizing fluid comprising;
    a housing having a housing bore with an open end and a closed end;
    a piston stop in the open end;
    first and second pistons reciprocably received in the housing bore and defining therewith a first pressurizing chamber between the pistons and a second pressurizing chamber between the second piston and the housing bore closed end,
    the pistons each having a piston cavity opening into the respective pressurizing chamber; and
    a first locator member and a second locator member respectively received in the pressurizing chambers and slidably mounted in the piston cavities of the respective pistons, the first locator member projecting into engagement with the rear wall of the second piston and the second locator member projecting into engagement with the housing to establish the pistons at respective normal rest positions enabling fluid communication between the fluid reservoir and the respective chambers; and
    a first means associated with the first locator member and a second means associated with the second locator member to permit the collapse of the locator members within the respective piston bore upon a first occurring forward movement of the pistons forward of the respective normal rest positions, and further acting to retain the locator members in their respective collapsed states whereby; the locator members remain in the bores and the pistons are freed for fore and aft reciprocable movement within the housing during subsequent operation of the master cylinder.

* * * * *